United States Patent [19]

Isono

[11] 4,346,975
[45] Aug. 31, 1982

[54] MULTIPLE CONTROL SYSTEM FOR CAMERA

[75] Inventor: Tadao Isono, Kokubunji, Japan

[73] Assignee: Osawa Precision Industries, Ltd., Japan

[21] Appl. No.: 63,021

[22] Filed: Aug. 2, 1979

Related U.S. Application Data

[63] Continuation-in-part of Ser. No. 860,030, Dec. 12, 1977, abandoned.

[30] Foreign Application Priority Data

Dec. 10, 1976 [JP] Japan ................................. 51-147758

[51] Int. Cl.$^3$ .......................... G03B 3/10; G03B 7/091
[52] U.S. Cl. ...................................... 354/195; 354/25; 354/23 D; 354/60 A; 352/140; 250/204
[58] Field of Search ................ 352/140, 141, 180–182; 354/25, 195, 31, 43, 44, 60 R, 60 A, 25 N, 31 F, 25 A; 250/201, 204

[56] References Cited

U.S. PATENT DOCUMENTS 4,059,758 11/1977 Wilwerding ......................... 354/25
4,078,172 3/1978 Wilwerding ......................... 354/25

Primary Examiner—L. T. Hix
Assistant Examiner—William B. Perkey
Attorney, Agent, or Firm—Robert E. Wagner; Ralph R. Rath

[57] ABSTRACT

An automatic adjustment system for a camera which time division multiplexes inputs from a scanning system, and an automatic exposure control or a film feeding motor speed control into an evaluation circuit. The same electronic circuitry is thereby used for evaluating the input from any of the mentioned adjusting systems to minimize the complexity and bulk of the camera circuitry necessary for processing. Each aforementioned automatic feature compares a respective pair of signals to determine the respective adjustment. A pair of signals is brought to a common condition indicative of proper adjustment by use of feedback from the actual state of the automatic system for the particular feature.

8 Claims, 4 Drawing Figures

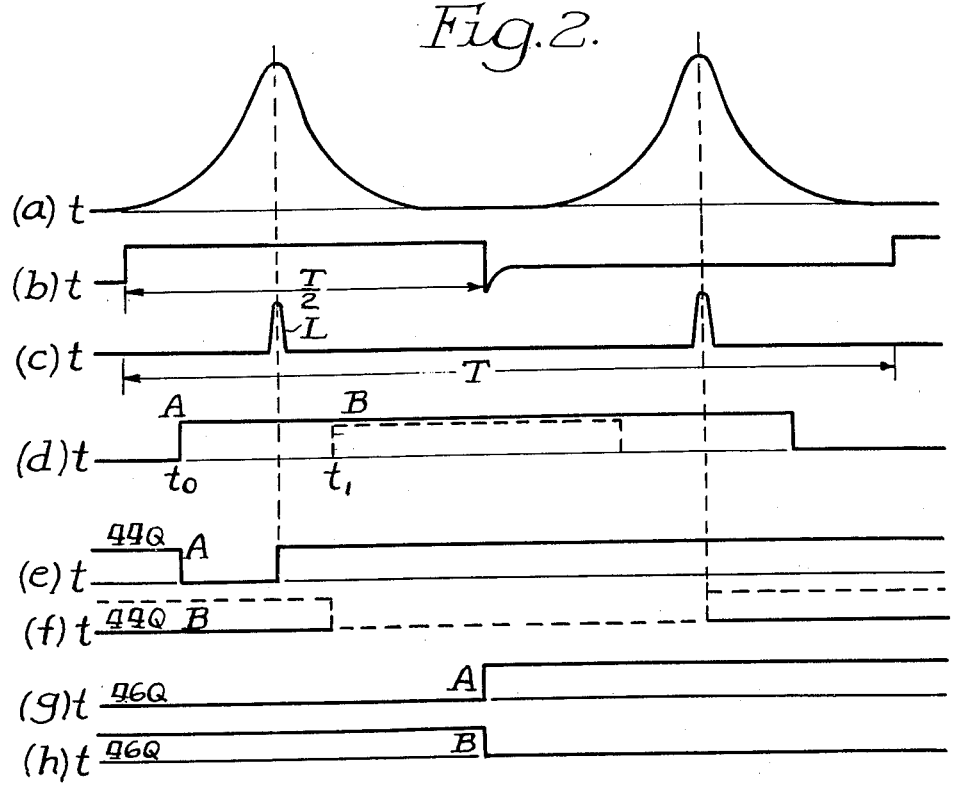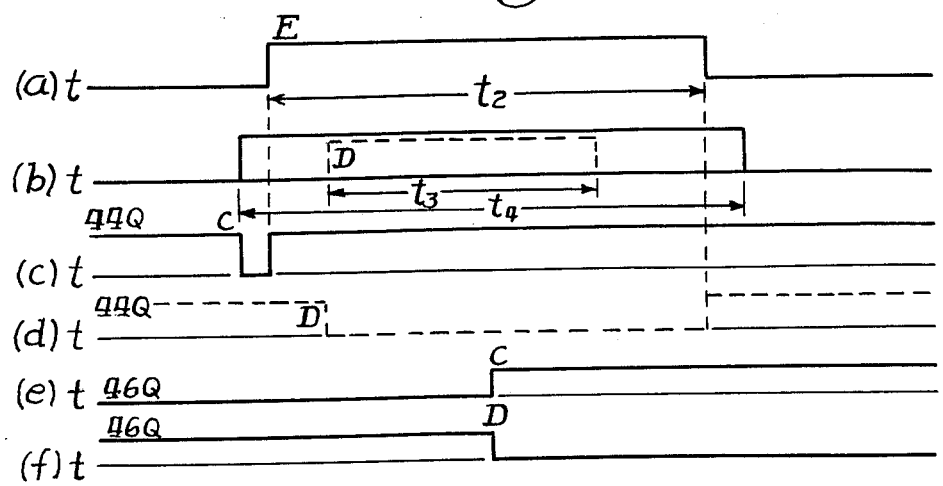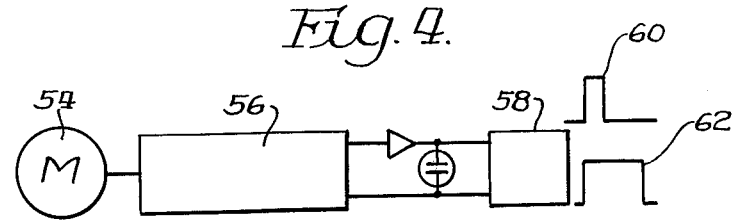

MULTIPLE CONTROL SYSTEM FOR CAMERA

BACKGROUND OF THE INVENTION

This is a continuation-in-part of Ser. No. 860,030 filed Dec. 12, 1977, now abandoned.

The present invention relates to cameras having automatic control systems for adjusting the various functions of the camera. Such systems may control the focus condition, the exposure condition and the film feed speed of a motion picture camera. While it is known to provide cameras with automatic control features, including the aforementioned features and others, the use of such features has necessitated complex, expensive and bulky electronic circuitry to process and evaluate the transduced inputs from the various monitoring devices for the various features. It has also been necessary to have high powered output devices to take the evaluated signals and transpose them to control the corresponding camera functions.

SUMMARY OF THE INVENTION

According to one aspect of the present invention, inputs to an evaluation circuit are time division multiplexed. More particularly, the illustrative embodiment includes a switching system which permits alternate evaluation of various automatic adjustments. Illustratively, the automatic focus adjusting system is permitted access to the evaluation circuitry alternately with an automatic exposure system or a film feed speed control system.

The evaluation circuitry compares a signal related to the actual or nominal state of camera adjustment against a signal which indicates the actual ambient condition. More particularly, in the case of automatic focusing there is a transduced ambient signal from an automatic rangefinder of the type generally described in U.S. Pat. No. 4,002,899. Such an automatic rangefinder, called a spatial image correlation type, includes two optical paths that direct light from the subject to be photographed to a photo detector. One of the optical paths is fixed relative to the rangefinder and camera lens and the other is movable. Rangefinding is accomplished by comparison of the image from the fixed path with the scanning path. When both optical paths are aligned with one another and directed toward the same subject, the detector generates a peak pulse (greater than any other) which by means of suitable electronic circuitry can be converted to a control signal for the automatic focusing motor. Basically, the circuitry compares a signal indicative of the lens position to the transduced signal representing the position of the subject. Feedback of the lens position permits perfect focusing.

For automatic exposure control a photo responsive cell is used to generate a signal which indicates the ambient light level of the subject. Such a signal may be modified for application to the evaluation circuit. More particularly, a cadmium-sulfide cell is used which has output resistance that varies in response to the light conditions of the subject. Such an output may be used to vary the width of the output of a one shot multivibrator such that it corresponds to the required ambient exposure value or ambient condition. That signal can be compared with a signal indicative of the condition of the camera iris in the electronic evaluation circuitry, and by means of a feedback technique the condition of the iris may be adjusted to meet the ambient condition. The same electronic circuitry for evaluation used as described previously for automatic focusing can be used for automatic exposure.

Similarly, the speed of film feeding for a motion picture camera can be controlled by using the same evaluation circuitry on a time share basis. The film feed motor speed may be measured by a tacho-generator which outputs a voltage indicative of the actual speed of film feeding. That signal can modulate a pulse width for comparison against a reference signal indicative of, for example, the speed at which the camera is set to operate by the operator, the loop control (for a sound system), or an automatic time delay system for start up.

BRIEF DESCRIPTION OF THE DRAWINGS

In describing the preferred embodiment, reference is made to the appended drawings in which:

FIGS. 2(a)-2(h) show signal diagrams of the relationship between the pulse generated by the automatic focus detector before, during and after modification by the evaluation circuit;

FIGS. 3(a)-3(f) show signal diagrams of the relationship between the pulse generated by the automatic exposure control circuit before, during and after application to the automatic evaluation circuit; and FIG. 4 is a schematic block diagram of transducer circuitry for sensing the speed of the film feeding motor, which can be used in place of the automatic exposure transducer circuit.

DETAILED DESCRIPTION OF THE DRAWINGS

Figure 1:
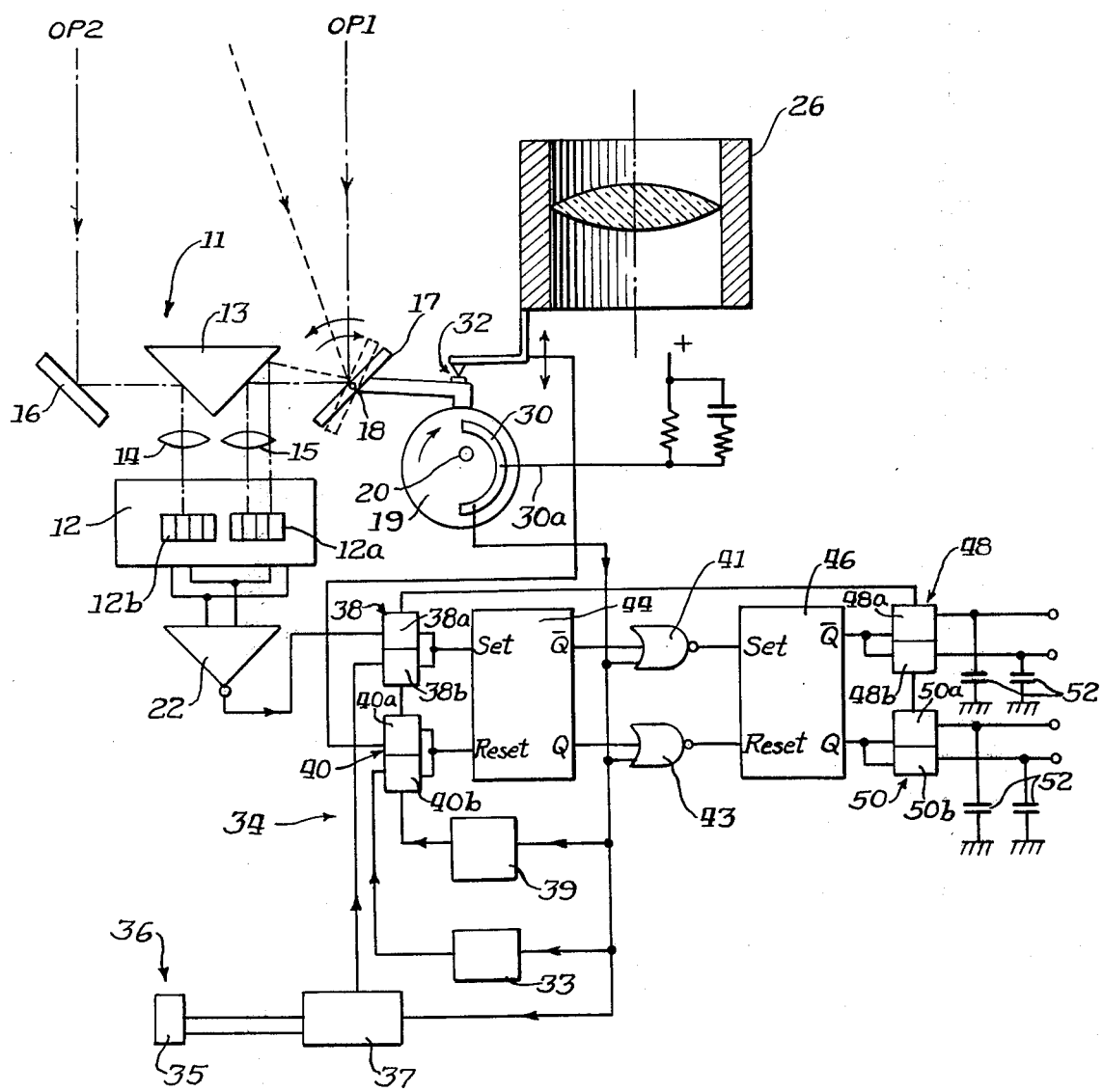
FIG. 1 is a schematic drawing of an automatic adjusting system according to the present invention wherein an automatic evaluation circuit receives multiplex inputs for adjustments of focus and exposures.

FIG. 1 shows a conventional rangefinding type automatic focusing device generally labelled 11. Such devices have two optical paths OP1 and OP2 leading from the subject to a photoresponsive cell and integrated circuit combination such as a Honeywell Visitronics module 12. A prism 13 and a pair of lenses 14 and 15 direct the optical paths OP1 and OP2, respectively, into the module 12; a fixed mirror 16 directs path OP2 onto prism 13; a movable scanning mirror 17 directs OP1 onto prism 13. Scanning mirror 17 moves pivotally upon an axis 18 such that OP1 varies angularly to intersect OP2 over a range falling within the distance of near focus to far focus (infinity) with respect to the camera. Mirror 17 engages, by a follower arm 17a, an eccentrically mounted disk 19 which pivots about an axis 20, and mirror 17 scans a limited range as disk 19 moves follower arm 17a.

Module 12 includes photoresponsive cells 12a and 12b which are typical in that in low light level situations their response time is delayed. The outputs of photoresponsive cells 12a and 12b are coupled to a differential amplifier 22 which compares the signals from cells 12a and 12b and issues a peak pulse when the signals are in coincidence. That is to say that, when OP2 and OP1 are aligned on the same subject, peak pulses as shown in FIGS. 2(a) and (c) are generated.

While the following is not shown, those skilled in the art will appreciate that the scanning mirror 17 may be coupled to the camera lens 26 such that the scanning range is directly coupled to the focus position of the camera lens. See, for example, further details in my application Ser. No. 860,031 filed Dec. 12, 1977, now abandoned, or in my U.S. Pat. No. 4,157,217. Briefly, however, to correlate the position of scanning mirror 17 with an object distance, disk 19 may be equipped with a position indicator system which provides information as to the position of the automatic focusing system. The position indicator system can include a signal generator switch such as an optical switch formed by disk 19 for controlling the passage of light rays from an auxiliary light source to a light sensitive receiver element. The light source and the receiver element are aligned relative to one another and fixed to a frame which is supported on an axis 20 about which the disk 19 rotates. The holder for mirror 17, disk 19, and the frame can be installed on the movable base support which is rotatable about a shaft arranged coaxially with axis 18 about which the scanner mirror 17 rotates. The base support is biassed into engagement with the objective lens 26 by a spring. As objective lens 26 is adjusted axially to an object distance for focusing of the image of a remote subject, the base support rotates, changing the scanning aspect of mirror 17 relative to the camera. According to predetermined relationships, mirror 17 is in the middle of its scanning arc when lens 26 is focused and a hole in disk 19 allows pulsed signals when the scanner mirror 17 scans the position corresponding to the object distance setting of objective lens 26. The foregoing frame and switch are shown schematically and labeled 32; the lens 26 position is indicated by the timing of the switch opening and closing.

Disk 19 carries an electrically conductive contact 30 which engages a sliding contact 30a at various relative positions of disk 19. A direct current voltage is carried across contacts 30 and 30a during a portion of each revolution of disk 19 (for ½ of each revolution). This gives the lens 26 position by the point at which the contacts open since the frame which supports the contact is movable in accordance with the position of the lens 26.

Thus, the focusing signal from amplifier 22 represents the distance of the subject to the camera ("ambient condition") and a second signal from contacts 30 and 30a represents the position of lens 26 relative to the camera. Both of these signals are applied to an evaluation circuit 34 which evaluates the difference between the two signals and issues a control signal to reposition lens 26 in accordance therewith.

Evaluation circuit 34 includes a pair of switches 38 and 40 selectively applying different inputs to the Set and Reset inputs of a first flip-flop 44. A pair of logic gates 41 and 43 selectively couple the outputs of flip-flop 44 to the inputs of a second RS flip-flop 46 and a pair of switches 48 and 50 selectively direct the outputs of flip-flop 46. Illustratively, switches 38, 40, 48 and 50 are all double pole double throw switches which can be automatically actuated by a single input. It will be understood that a variety of semi-conductor switches such as CMOS devices for example, relays, or other kinds of switches can be used.

Automatic switches 38, 40, 48, and 50 are activated during the return scanning cycle of mirror 17 by the contact switch 30 and 30a on disk 19 by means of a time delay switch 39. Switch 39 receives an output signal shown in FIG. 2(b) from contacts 30 and 30a during the forward scan of mirror 17 and provides a time delayed output to account for the lag in response time of the automatic focus system 11 and the automatic exposure control 36. The output signal from the switch 39 during the forward scan of mirror 17 sets switches 38, 40, 48 and 50 so that the segments 38a, 40a, 48a and 50a conduct and so that the segments 38b, 40b, 48b, and 50b are blocked. Hence, during this time period, evaluation circuit 34 receives signals from differential amplifier 22 and from lens position contacts 32.

During the return scan of the mirror 17, time delayed switch 39 is operated to cause switches 38, 40, 48, and 50 to block the segments 38a, 40a, 48a and 50a, and to render the segments 38b, 40b, 48b and 50b conductive. During this time period, the automatic exposure control 36 and a median exposure control circuit 33 provide the inputs to evaluation circuit 34.

Evaluation circuit 34 operates as follows. The focusing signal from amplifier 22 is applied to side 38a of switch 38, and the signal from lens position switch 32 is applied to side 40a of the automatic switch 40. FIG. 2(c) shows the sharpened and modified wave pulse of FIG. 2(a) applied to the switch 38. The wave form A shown in FIG. 2(d) begins at time $t_0$ and is the lens position signal applied to switch 40a. As illustrated, lens 26 is beyond the required focus position. Thus, when the switches are in the position shown, the pair of focusing signals, one indicative of the ambient condition of the distance of the subject to the camera and the other indicative of the lens position, are applied to the Set and Reset inputs, respectively, of flip-flop 44. The Q output of flip-flop 44 is shown in FIG. 2(e) and is a function of the difference between the focus condition required and the actual focus of camera lens 26.

Thus, the Q and $\overline{Q}$ outputs of the flip-flop 44 are related to the out-of-focus condition of the lens 26. This information is applied to NOR gates 41 and 43, each of which also receives an input signal from switch 30 and 30(a) of disk 19 during half of each scanning cycle. Thus, according to standard NOR gate logic, no change in the Q or $\overline{Q}$ outputs of flip-flop 44 will cause a change in the output of NOR gates 41 and 43 when a signal is inputted from contacts 30 and 30(a) (a logic "high"). However, when there is no signal from the contacts 30 and 30(a), as during the forward scan of the mirror 17, the signals from the output of the flip-flop 44 will be transmitted (not blocked) by NOR gates 41 and 43. Flip-flop 44 will be toggled as shown in FIG. 2(g) at A. The outputs of flip-flop 46 are inputted to switches 48 and 50 which selectively couple the flip-flop 46 outputs to portions of an integrator circuit shown as capacitors. The charge on capacitors 52 is related to the amount that lens 26 is out of focus.

The dotted line wave forms B shown in FIGS. 2(d) and 2(f) illustrate the condition where lens 26 is focused too close for a subject. The low to high transition of signal B at time $t_1$, toggles flip-flop 44, which is next toggled by the focusing peak generated in connection with the return scan (the second focusing signal of FIG. 2(c). The portion of the scanning cycle in which the focusing position is detected is reversed to the extent that the later peak pulse is used to reset the flip-flop 44, and flip-flop 46 will be toggled as shown in FIG. 2(h). While not shown, those skilled in the art will appreciate that the measured amplitude control signals at FIGS. 2(g) or 2(h) can be used to activate the lens 26 motor control to move the lens 26 in or out in accordance with the amplitude of the signal, thereby automatically adjusting the focus of the camera.

Also shown in FIG. 1 is an automatic exposure circuit 36 which includes a photoresponsive cell 35 such as a cadmium-sulphide cell whose resistance varies in accordance with the amount of light received by it. Cell 35 is coupled to a one shot multi-vibrator 37 so as to vary the duration of its output in accordance with the level of light sensed by the cell 35. In order to establish a datum or reference against which the exposure is set, a one shot multi-vibrator 33 provides a signal E that corresponds to a nominal or medium exposure value which is shown illustratively at FIG. 3(a). FIG. 3(b) represents the output of multi-vibrator 37 whose pulse width $t_4$ represents a correct exposure value. Illustratively, the width $t_4$ exceeds the width $t_2$ of the signal E, the medium exposure value. The two widths are processed at flip-flop 44. As shown in FIG. 3(c), the leading edge of FIG. 3(b) toggles flip-flop 44 and the leading edge of signal E next toggles flip-flop 44 to generate an output pulse which represents the amount of exposure correction necessary. On the other hand, when the sensed exposure value D is less than the medium exposure value E in width, the wave form in FIG. 3(d) represents a different correct exposure value.

In view of the previous explanation concerning the timing of contact 30 relative to switches 38, 40, 48, and 50 and NOR gates 41 and 43, it will be understood that the exposure control system 36 operates alternately with the automatic focus system 11 because NOR gates 41 and 43 block the output signals of flip-flop 44 in accordance with the opening and closing of the switch contacts 30 and 30a. Accordingly, FIGS. 3(e) and 3(f) show output signals of flip-flop 46 corresponding to exposure corrections which are transformed to amplitude signals by capacitors 52. In sum, the difference between the required exposure and the medium exposure as defined by pulses from flip-flop 44 is transformed into a pulse of a particular amplitude representative of the necessary change. The amplitude signals can then be transmitted to a control circuit (not shown) which activates the control motor of the iris of the camera. It will be noted that time delay circuit 39 accounts for both the response time necessary for the CdS cell 35 in the control system 36 and for the time delay in the detector 12.

FIG. 4 shows another example of a control system for use with the evaluation circuit 34 alternately with automatic focus control system 11. The system of FIG. 4 is to control the speed of film feeding by a film feeding motor 54. A tacho-generator 56 is coupled to motor 54 and outputs a voltage representing the speed of motor 54. That voltage is applied to a multi-vibrator 58. When the motor 54 speed is faster than some reference speed (which may be manually selectable), tacho-generator 56 causes multi-vibrator 58 to emit a pulse 60 of a relatively small width. Conversely, when the motor 54 speed is slower than the reference, a wider pulse 62 is emitted. It can be seen that the pulses of varying width from the multi-vibrator 58 can be evaluated against a pulse generated from a reference voltage from another multi-vibrator (not shown) in the same manner as the output of system 36 is evaluated against the output of one shot multi-vibrator 33.

Those skilled in the art will no doubt appreciate that many variations may be made to the basic concept. For example, the automatic focusing control system can alternately be used with a multitude of different kinds of adjusting systems such that on the forward scan the automatic focusing is evaluated, and on the return scan some other control function such as exposure, motor speed, etc. can be evaluated. Those skilled in the art will further appreciate that switching similar to that shown can be included to sequentially input the alternate control system to be evaluated on the return scan portion of the cycle. Thus, the basic evaluation system which is time shared can be used for a number of functions in the camera, thereby lowering the cost and improving the operation of the instrument. The claims that follow are intended to cover the broad concept and not just particular embodiment shown and described in this specification.

What is claimed is:
1. An automatic optical instrument adjusting system for comparing transduced inputs of ambient conditions with the levels representative of states of the instrument and for correctively adjusting the instrument state in response to the difference between the conditions and the state comprising:
focusing means for providing signals dependent on the distance to a subject and converting same to timed pulses representative of each ambient condition;
measuring means defining the setting of the objective lens of the instrument and converting same to timed pulses representative of each operative state;
a timed pulsing apparatus for regularly and periodically issuing controlling signals;
an evaluation circuit for processing two inputted timed pulses and for generating output signals having timing relative to the differences between said two inputted timed pulses;
automatic switch means connected between said focusing means, said measuring means and said evaluation circuit and operated by said timed pulsing apparatus for selectively controlling the inputs to said evaluation circuit; and
storage circuit means connected to selectively receive signals from said evaluation circuit and for holding said signals representative of the difference between the conditions and the states until an updated signal of the same type is received.

2. The system of claim 1 wherein said evaluation circuit includes a flip-flop connected for receiving signals from said focusing means and said measuring means.

3. The system of claim 1 wherein said automatic switch includes a bilateral CMOS solid state device responsive to said timed pulsing apparatus.

4. The system of claims 1 wherein said storage circuit means includes a flip-flop connected to selectively receive signals from said evaluation circuit.

5. The system of claim 1, further including NOR gates connected between said evaluation circuit and said storage circuit means and responsive to signals from said evaluation circuit and said timed pulsing apparatus.

6. The system of claim 1 wherein said timed pulsing apparatus is connected to said focusing means and said focusing means is an oscillating scanner for an automatic focusing system whereby the oscillation of said scanner are related to the timing of said pulsing.

7. The system of claim 6 wherein said automatic switching means connects said scanner to said evaluation circuit during an oscillation of said scanner and disconnects said scanner during the following oscillation.

8. The system of claim 7 wherein said automatic switching means connects an automatic exposure system to said evaluation circuit during the portion of said scanning when said scanner is disconnected.

* * * * *